July 7, 1959   I. K. DORTORT   2,894,149
CROSS-COMPOUNDING OF MACHINE REGULATORS
Filed June 19, 1958   2 Sheets-Sheet 1
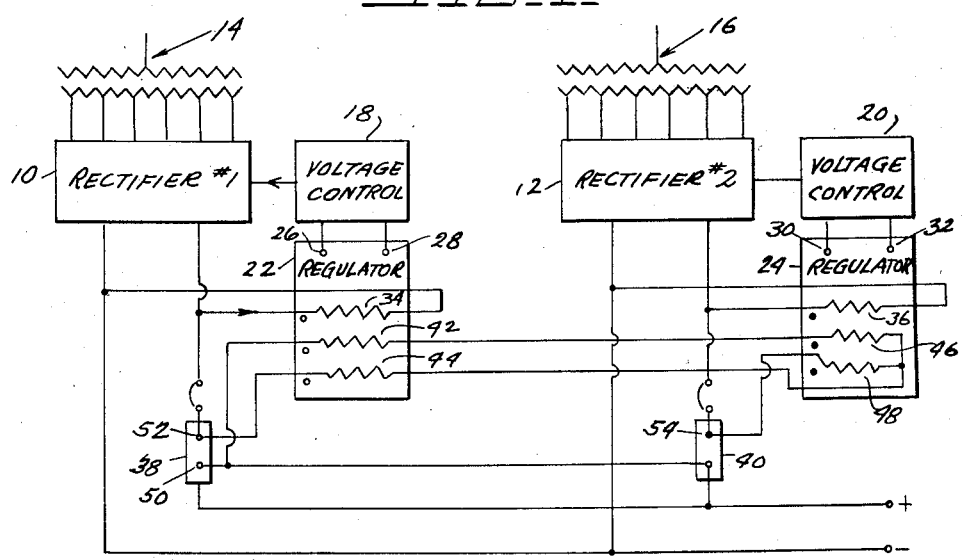
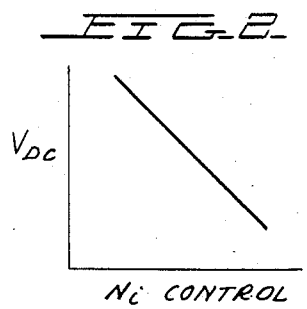
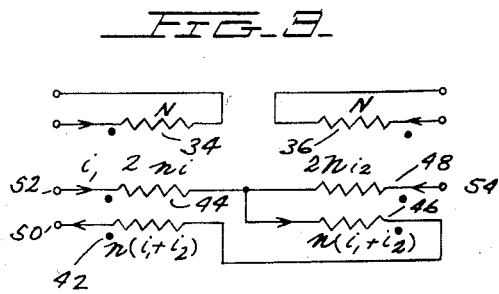
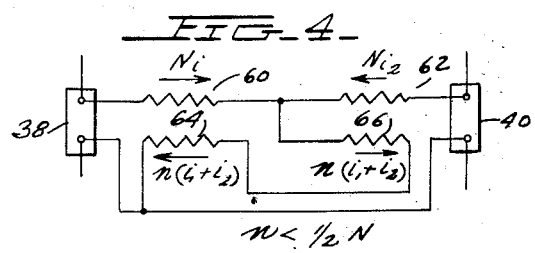
INVENTOR.
ISADORE K. DORTORT
BY
ATTORNEYS July 7, 1959   I. K. DORTORT   2,894,149
CROSS-COMPOUNDING OF MACHINE REGULATORS
Filed June 19, 1958   2 Sheets-Sheet 2

INVENTOR.
ISADORE K. DORTORT
BY
ATTORNEYS

United States Patent Office 2,894,149
Patented July 7, 1959

2,894,149
CROSS-COMPOUNDING OF MACHINE REGULATORS

Isadore K. Dortort, Philadelphia, Pa., assignor to I-T-E Circuit Breaker Company, Philadelphia, Pa., a corporation of Pennsylvania Application June 19, 1958, Serial No. 743,189

8 Claims. (Cl. 307—57)

This invention relates to a cross-compounding system for parallel connected electrical devices such as rectifiers or generators which are regulated for constant voltage or constant current output.

Generally, cross-compounding circuits alter the control level of the parallel connected machine outputs. My novel invention provides a system wherein the cross-compounding between parallel connected machines may be achieved without effecting the control level of the machines.

My novel system provides a compounding signal to the voltage or current control means of each respective machine being regulated which is governed by the following relation:

$$i_{sm} = k\left(\frac{I_m - I_1 + I_2 + I_m + \ldots + I_n}{n}\right)$$

In the above noted equation, $I_1, I_2 \ldots +I_n$ represent the percentage of the load setting on each machine of a plurality of parallel connected machines, $m$ is the percentage load of machine $m$ under consideration, $k$ is a constant, and $i_{sm}$ is the correcting signal to be applied to the regulator of machine $m$. The second term of above noted equation represents the average percent of desired load of all of the machines of the parallel connected system. By subtracting this average load from the percentage load of the machine in question, the amount of correction required to bring machine $m$ to this average value is given by the signal $i_{sm}$.

While any type of regulating device may be utilized to carry out my invention, I shall illustrate the invention in conjunction with a magnetic amplifier type of regulator wherein the control windings of the magnetic amplifier receive a first signal which is proportional to the average percent of rated current being carried by all of the parallel connected machines, and a second signal which is proportional to the current of its own particular machine. These signals are subtracted from one another within the magnetic amplifier so as to develop a net ampere turn signal when the average percent of rated current of all of the machines are not equal to the percent of rated current carried by the machine in question, this ampere turn difference operating to correct the output of the machine.

Accordingly, a primary object of this invention is to provide a novel cross-compounding for parallel connected electrical devices.

Another object of this invention is to provide a novel cross-compounding system for machine regulators wherein the control level of the machines being controlled is not changed because of the cross-compounding.

Another object of this invention is to provide a simple and reliable cross-compounding system for a plurality of regulators of parallel connected electrical machines.

These and other objects of this invention will become apparent from the following description when taken in connection with the drawings, in which:

Figure 1 shows a first embodiment of my invention when used with machines which are regulated for constant voltage output.

Figure 2 shows the manner in which the output voltage of either of the machines of Figure 1 is affected by a difference in ampere turns in the cross-compounding windings.

Figure 3 is a simplified diagram of the cross-compounding circuitry of Figure 1 which permits easier understanding and description of the circuit.

Figure 4 shows the manner in which the cross-compounding circuit of Figure 1 may be altered for constant current regulation of the various machines.

Figure 5:
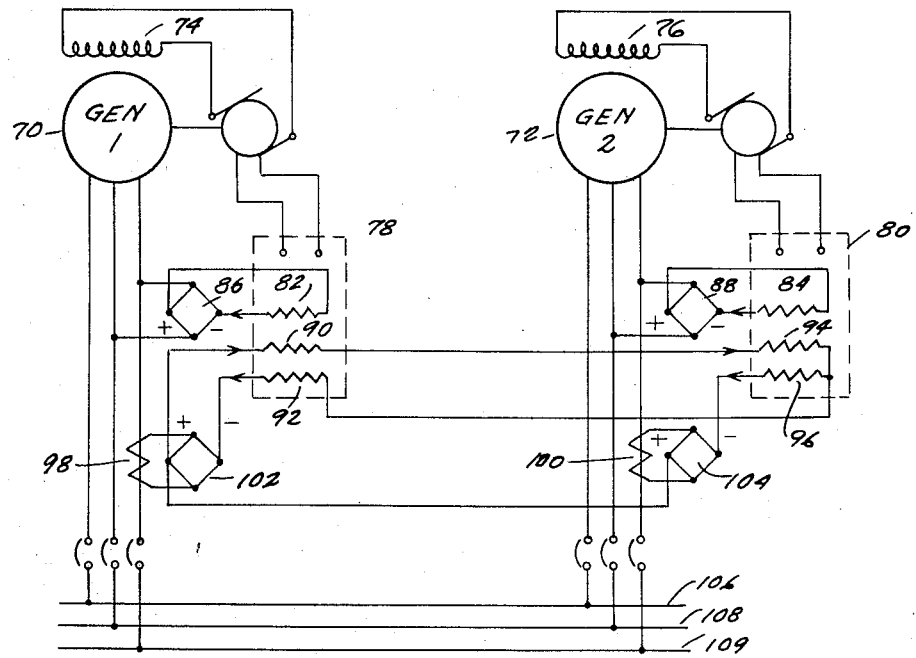
Figure 5 shows the manner in which my novel invention may be applied to parallel connected A.-C. generators which are individually regulated for constant voltage output.

Referring now to Figure 1, a first and second rectifier 10 and 12 respectively are schematically shown as having A.-C. inputs 14 and 16 respectively from some source of A.-C. power (not shown). The output voltage of each of rectifiers 10 and 12 is controlled by some voltage control means indicated in Figure 1 as voltage control means 18 and 20 respectively.

This voltage control system may be of any desired type depending upon the type of rectifier being utilized. Since the specific structure of the voltage control means is not important in the understanding of the invention, they will only be shown in schematic form. Details of one type of voltage control means may be had with reference to Patent No. 2,817,805, issued December 24, 1957, entitled Flux Reversal Circuit for Commutating Reactors of Mechanical Rectifiers to E. J. Diebold which describes a flux reversal type of voltage control system for a mechanical or semi-conductor type rectifier.

In the embodiment of Figure 1, each of voltage control means 18 and 20 are energized from the output of regulators 22 and 24 respectively. Since the type of regulator used is not essential to the invention, they are shown in schematic form only, and for illustrative purposes, are assumed to be magnetic amplifier type of regulators. Since magnetic amplifiers are so well known in the art, it is only necessary to show the input windings of the magnetic amplifier regulators with the voltage control structures 18 and 20 being connected at output terminals 26—28 and 30—32 of regulators 22 and 24 respectively.

Each of regulators 22 and 24 have a first input control windings 34 and 36 respectively which are connected across the output of their respective rectifiers 10 and 12. Input windings 34 and 36 operate to generate an output voltage at their respective output terminals 26—28 and 30—32 so as to control voltage control means 18 and 20 respectively in order to maintain the output voltage of rectifiers 10 and 12 respectively at some constant value.

This control characteristic may be seen in Figure 2 for the case of rectifiers 10 or 12. From Figure 2, when the ampere turns of the input or control windings 34 or 36 is increased, the output voltage will decrease. Conversely, when the ampere turns of the control winding decreases the output voltage will increase. Therefore, if the output voltage of one of the rectifiers increases above a predetermined value, the ampere turns applied to the control winding of its regulator will increase so as to bring the output voltage back to its predetermined value as determined by some reference means (not shown). In a similar manner, a decrease in output voltage will be brought back to the predetermined value by the regulator.

Since rectifiers 10 and 12 have a constant output voltage, when they are connected in parallel to the load division between the two rectifiers is indeterminate so that one rectifier may carry all of the load while the other rectifier carries none of the load. My novel cross-compounding circuit is provided in order to assure an equal or some predetermined current distribution between the two machines.

The cross-compounding circuit of Figure 1 includes a first and section current measuring means 38 and 40 for measuring the output current of rectifiers 10 and 12 respectively. This current measuring means may be of any desired type and is shown in Figure 1 as a shunt for purposes of illustration. Each of regulators 22 and 24 then have cross-compounding windings 42—44 and 46—48 respectively where the windings 42 through 48 are wound in directions illustrated by the heavy dot at the left-hand side of the windings.

The windings 44 and 48 of regulators 22 and 24 respectively will be shown hereinafter to conduct a current which is functionally related to the output current of their respective rectifier.

The middle windings 42 and 46 of regulators 22 and 24 conduct a current proportional to the total output current of the parallel connected machines divided by the number of machines in parallel. This division operation is achieved in Figure 1 by making the number of turns of windings 42 and 46 one-half that of the number of turns of windings 44 and 48. If $n$ machines are connected in parallel, windings 42 and 46 would have $1/n$ times the number of turns of windings 44 and 48, respectively.

More generally stated, however, the ratio of turns of the first winding to the second winding will be $$i_m/(i_1+i_2+ \ldots i_m \ldots +i_n)$$

where the $i$'s are the measuring circuit currents of the machines at their desired loadings.

The operation of this circuit will now be described in conjunction with Figure 3 which substantially duplicates the cross-compounding circuitry of Figure 1, but re-arranges the circuitry for easier understanding.

In Figure 3, the input to winding 42 is seen to be taken from terminal 50 which is the bottom terminal 50 of shunt 38 of Figure 1, and is at the same potential as the bottom of shunt 40. The input to winding 44 of regulator 22 is at terminal 52 which is the upper of positive terminal of shunt 38. The input to winding 48 is the upper or positive terminal 54 of shunt 40.

From this circuitry, a current $i_1$ which is proportional to the current through shunt 38, is impressed upon the circuit at terminal 52 and will flow through winding 44, winding 46, winding 42 to terminal 50. In a similar manner, a current $i_2$ which is proportional to the output current of rectifier 12 is connected at terminal 54 and flows through winding 48, winding 46, winding 42 to terminal 50.

Assuming first that the currents $i_1$ and $i_2$ are equal to one another and that windings 42 and 46 have $n$ turns, while windings 44 and 48 have $2n$ turns, under normal conditions the ampere turns of the constant voltage regulator windings 34 and 36 are unaffected, since the ampere turns in windings 42 and 44 and windings 46 and 48 are equal and opposite. Thus, each machine is delivering its predetermined constant output voltage, and the current between the two machines is distributed in its predetermined manner.

If, however, the output current of machine or rectifier 10 increases while the output current of machine 12 decreases, then the cross-compounding circuits will come into play. Under this condition, $i_1$ of Figure 3 increases, while $i_2$ decreases. The ampere turns of winding 44 will, therefore, increase while the ampere turns of winding 48 decreases. However, the ampere turns of windings 42 and 46 will be maintained constant.

The increase in ampere turns of winding 44 is in a direction to add to the net ampere turns of control winding 38 so that the total ampere turns of all of the control windings will increase so as to decrease the output voltage of the rectifier, as seen in Figure 2. This decrease in the output voltage of the rectifier will, of course, bring down the output current of the rectifier towards the predetermined value it is to have under the predetermined balanced current conditions.

In a similar manner, the regulator for rectifier 12 will be influenced to increase the output voltage of its respective rectifier so as to bring its decreased load current back to its predetermined balanced condition. That is, since current $i_2$ has decreased, the net ampere turns of the three control windings 36, 46 and 48 will decrease so as to increase the output voltage of rectifier 12, thus bringing its current back to its predetermined load balanced condition.

Accordingly, cross-compounding between the two rectifiers 10 and 12 is easily achieved by the simple structure set forth in Figure 1.

While Figure 1 illustrates my cross-compounding circuit in conjunction with machines, that are regulated, for a constant voltage output, it is to be understood that my cross-compounding circuit could similarly be applied to machines which are regulated to have a constant current output. However, in such a case, instead of two cross-compounding windings, only a single cross-compounding winding is required.

The ampere turns of the main control winding are added to those of the second control winding in this application, and the turns of ratio of the second to the first control winding is made greater than the number of machines. The excess ampere turns of the second control winding then at the control level of the regulator, when compared to a reference signal applied in the bias or auxiliary control winding.

This is seen in Figure 4 which fragmentarily shows the circuit of Figure 1 for cross-compounding between constant current regulated rectifiers. Here again, the shunts 38 and 40 measure the particular current being carried by their respective rectifiers 10 and 12. The signals derived from shunts 38 and 30 are then compared to a reference signal in the constant current regulating windings 60 and 62 so as to maintain some particular current level for each respective rectifier. The reference signal is generally applied in a bias winding, not shown, in the method well known in the art.

In order to compound the circuits so as to further control the output currents to have some predetermined percentage of the full load current, I have added the cross-compounding windings 64 and 66 respectively which operate in an identical manner to windings 42 and 46 of Figure 3. The number of turns N of windings 60 and 62 is greater than twice the number of turns of each of windings 64 and 66. In the case of Figure 4, the lower cross-compounding windings 64 and 66 will operate to maintain the predetermined load distribution between the two machines. When the loads are balanced, the difference in ampere turns between the upper and lower windings of the rgeulators will operate to maintain the current output of each respective machine 10 or 12 at its predetermined constant level. If N is made exactly equal to $2_n$, the regulator losses control. The larger N is made with respect to $n$, the more sensitive the control function of the regulator becomes.

While Figures 1 and 4 illustrate the invention in conjunction with a D.-C. output of parallel connected rectifiers, it will be obvious that my novel cross-compounding circuit may be applied to the parallel connection of any type of electrical device.

By way of example, in Figure 5, the two machines to be connected in parallel are a first and second A.-C. generator 70 and 72 respectively. Each of generators 70 and 72 are regulated to have a constant output voltage which is controlled by controlling the excitation of their respective exciter windings 74 and 76 from the output of their respective regulators 78 and 80.

Regulators 78 and 80 are identical to regulators 18 and 20 respectively of Figure 1 and contain therein first windings 82 and 84 for maintaining a constant output voltage. These windings are energized by the schematically illustrated single phase bridge connected rectifiers 86 and 88 respectively connected to the outputs of generators 70 and 72 respectively.

The two lower windings 90—92 and 94—96 of regulators 78 and 80 respectively are the cross-compounding windings and are energized responsive to the current generated by each of generators 70 and 72. In the case of Figure 1, this output current was measured by shunt means, but in the case of Figure 5, the output current is measured by A.-C. current transformers 98 and 100 respectively which have their outputs rectified by single phase bridge connected rectifiers 102 and 104 respectively.

Clearly, the operation of the regulator circuit shown in Figure 5 will be identical to that of Figure 1 so as to maintain the load supplied by generators 70 and 72 to the A.-C. buses 106, 108 and 109 at some constant predetermined load division.

Figure 6:
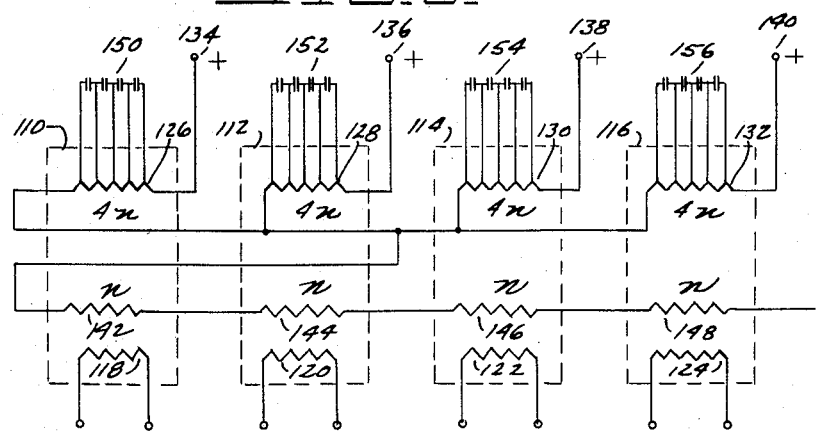
Figure 6 is a functional diagram which illustrates the cross-compounding circuitry of this invention in conjunction with four regulators of four parallel connected machines.

The embodiments set forth above have illustrated my novel cross-compounding circuit for the case where two machines are connected in parallel. Clearly, my invention could apply to the parallel connection of any desired number of machines. Figure 6 schematically shows an application of my invention to four regulators 110, 112, 114 and 116 of four respective parallel connected devices. In Figure 6, the regulators are identical to the regulators of Figure 1 and each contains a first input control winding 118, 120, 122 and 124 which is energized from its respective machine and operates to maintain a constant voltage output from that respective machine. The machines are then cross-compounded by means of windings 126, 128, 130 and 132 respectively which carry a current and thus develop a certain number of ampere turns in their respective regulator which is proportional to the current delivered by their respective machine.

Following the schematic representation of Figure 3, Figure 6 shows each of windings 126 through 132 as having terminals 134, 136, 138 and 140 respectively which are connected to receive a current proportional to the current of the respective machine. These currents are then combined at the other terminal of each winding and then are each conducted through series connected windings 142, 144, 146 and 148 of regulators 110 through 116 respectively. Since windings 142 through 148 are to give a measure of the average current conducted by each machine, as compared to the current contributed by its own machine, the number of turns of windings 142 through 148 are one-fourth of the number of turns of windings 126 through 132 respectively.

This is illustrated in the drawing where windings 126 through 132 are shown to have 4 $n$ turns, while windings 142 through 148 are shown to have $n$ turns.

Accordingly, when the system is completely balanced, the ampere turns of windings 126—148, 128—144, 130—148 and 132—148 will be equal and opposite. When, however, there is an unbalance between any of two machines, this unbalance will be corrected in the manner described for the case of Figure 1.

Contactor means 150, 152, 154 and 156 are provided for each of windings 126, 128, 130 and 132 respectively whereby one-fourth, one-half, or three fourths of the winding is used, depending upon the number of machines in service.

It will be noted from the above, and obvious to those skilled in the art that my novel balancing or cross-compounding windings need not be applied directly to the regulators, but may be applied to the control means of the machines themselves such as exciters, flux reversal circuits, amplifiers, mercury arc grids and so on.

Although I have described preferred embodiments of my novel invention, many variations and modifications will now be obvious to those skilled in the art, and I prefer therefore to be limited not by the specific disclosure herein but only by the appended claims.

I claim:

1. A cross-compounding circuit for a first and second regulator of a first and second parallel connected machine respectively; each of said first and second regulators having a respective input for receiving an input signal to control the output of their respective machine; a first circuit means for measuring the average current delivered by said first and second means and imposing a signal functionally related to said average output on said input means of said first and second regulator; a second circuit means for each of said first and second regulators for measuring the current delivered by its respective machine and imposing a signal functionally related to the output current of each respective machine on the input of its respective regulator; said signals functionally related to average current and to the current of each respective machine being connected to said inputs of said regulators to oppose one another; the difference between said signals forming a compounding signal at the input of said regulator to cause said first and second regulators to maintain their respective machines at some predetermined load division.

2. A cross-compounding circuit for a first and second regulator of a first and second parallel connected machine respectively; each of said first and second regulators having a respective input for receiving an input signal to control the output of their respective machine; a first circuit means for measuring the average current delivered by said first and second means and imposing a signal functionally related to said average output on said input means of said first and second regulator; a second circuit means for each of said first and second regulators for measuring the current delivered by its respective machine and imposing a signal functionally related to the output current of each respective machine on the input of its respective regulator; said signals functionally related to average current and to the current of each respective machine being connected to said inputs of said regulators to oppose one another; the difference between said signals forming a compounding signal at the input of said regulator to cause said first and second regulators to maintain their respective machines at some predetermined load division; said first and second regulators being of the magnetic amplifier type; said first circuit means being connected to a first control winding; said second circuit means being connected to a second circuit means; said first and second control windings generating ampere turns in opposing directions.

3. A cross-compounding circuit for a first and second regulator of a first and second parallel connected machine respectively; each of said first and second regulators having a respective input for receiving an input signal to control the output of their respective machine; a first circuit means for measuring the average current delivered by said first and second means and imposing a signal functionally related to said average output on said input means of said first and second regulator; a second circuit means for each of said first and second regulators for measuring the current delivered by its respective machine and imposing a signal functionally related to the output current of each respective machine on the input of its respective regulator; said signals functionally related to average current and to the current of each respective machine being connected to said inputs of said regulators to oppose one another; the difference between said signals forming a compounding signal at the input of said regulator to cause said first and second regulators to maintain their respective machines at some predetermined load division; said first and second regulators being of the magnetic amplifier type; said first circuit means being connected to a first control winding; said second circuit means being connected to a second control winding; said first and second control windings generating ampere turns in opposing directions; said first circuit means measuring a value proportional to the total current delivered by said first and second machines; said firest control winding having one-half the number of turns of said second control winding whereby the signal of said first control winding is proportional to the said average current of said first and second machines.

4. A cross-compounding circuit for a plurality of regulators of a plurality of parallel connected machines respectively; each of said regulators having a respective input for receiving an input signal to control the output of their respective machine; first circuit means connected between the outputs of each of said machines and the said inputs of each of said regulators for imposing a signal functionally related to the average output current of each of said machines on each of said regulator inputs; second circuit means for each respective regulator and machine connected between the output of each of said machines and its respective regulator input for delivering a signal functionally related to the output of its respective machine to each of said regulators; said signals functionally related to average current and to the current of the respective machine being connected to said inputs of said regulators to oppose one another; the difference between said opposing signals forming a compounding signal at the input of said regulator to cause said regulators to maintain their respective machines at some predetermined load division.

5. A cross-compounding circuit for a plurality of regulators of a plurality of parallel connected machines respectively; each of said regulators having a respective input for receiving an input signal to control the output of their respective machine; first circuit means connected between the outputs of each of said machines and the said inputs of each of said regulators for imposing a signal functionally related to the average output current of each of said machines on each of said regulator inputs; second circuit means for each respective regulator and machine connected between the output of each of said machines and its respective regulator input for delivering a signal functionally related to the output of its respective machine to each of said regulators; said signals functionally related to average current and to the current of the respective machine being connected to said inputs of said regulators to oppose one another; the difference between said opposing signals forming a compounding signal at the input of said regulator to cause said regulators to maintain their respective machines at some predetermined load division; each of said regulators being of the magnetic amplifier type; said first circuit means being connected to a first control winding of each of said regulators; said second circuit means being connected to a respective second control winding of each of said regulators generating ampere turns in opposing directions.

6. A cross-compounding circuit for a plurality of regulators of a plurality of parallel connected machines respectively; each of said regulators having a respective input for receiving an input signal to control the output of their respective machine; first circuit means connected between the outputs of each of said machines and the said inputs of each of said regulators for imposing a signal functionally related to the average output current of said machines on each of said regulator inputs; second circuit means for each respective regulator and machine connected between the output of each of said machines and its respective regulator input for delivering a signal functionally related to the output of its respective machine to each of said regulators; said signals functionally related to average current and to the current of the respective machine being connected to said inputs of said regulators to oppose one another; the difference between said opposing signals forming a compounding signal at the input of said regulator to cause said regulators to maintain their respective machines at some predetermined load division without changing the total output; each of said regulators being of the magnetic amplifier type; said first circuit means being connected to a first control winding of each of said regulators; said second circuit means being connected to a respective second control winding of each of said regulators; said first and second windings of each of said regulators generating ampere turns in opposing directions; said first circuit means measuring a value proportional to the total current delivered by said plurality of machines; said first control winding of each of said regulators having a number of turns equal to the number of turns of said second winding divided by the number of parallel connected machines whereby the signal imposed on said first control winding is proportional to the average current of said plurality of machines.

7. A cross-compounding circuit for a plurality of regulators of a plurality of parallel connected machines respectively; each of said regulators having a respective input for receiving an input signal to control the output of their respective machine; first circuit means connected between the outputs of each of said machines and the said inputs of each of said regulators for imposing a signal functionally related to the average output current of each of said machines on each of said regulator inputs; second circuit means for each respective regulator and machine connected between the output of each of said machines and its respective regulator input for delivering a signal functionally related to the output of its respective machine to each of said regulators; said signals functionally related to average current and to the current of the respective machine being connected to said inputs of said regulators to oppose one another; the difference between said opposing signals forming a compounding signal at the point of said regulator to cause said regulators to maintain their respective machines at some predetermined load division; each of said regulators being of the magnetic amplifier type; said first circuit means being connected to a first control winding of each of said regulators; said second circuit means being connected to a respective second control winding of each of said regulators; said first and second windings of each of said regulators generating ampere turns in opposing directions; said first circuit means measuring a value proportional to the total current delivered by said plurality of machines; said first control winding of each of said regulators having a number of turns equal to the number of turns of said second winding divided by the number of parallel connected machines whereby the signal imposed on said first control winding is proportional to the average current of said plurality of machines; the number of effective turns of said first winding being adjustable for the number of machines connected in parallel.

8. A cross-compounding circuit for a first and second control means of a first and second parallel connected machine respectively; each of said first and second control means having a respective input for receiving an input signal to control the output of their respective machine; a first circuit means for measuring the average current delivered by said first and second means and imposing a signal functionally related to said average output on said input means of said first and second control means; a second circuit means for each of said first and second control means for measuring the current delivered by its respective machine and imposing a signal functionally related to the output current of each respective machine on the input of its respective control means; said signals functionally related to average current and to the current of each respective machine being connected to said inputs of said control means to oppose one another; the difference between said signals forming a compounding signal at the input of said control means to cause said first and second control means to maintain their respective machines at some predetermined load division.

No references cited.